United States Patent
Perreault et al.

(10) Patent No.: US 9,886,742 B2
(45) Date of Patent: Feb. 6, 2018

(54) ELECTRO-OPTIC BEAM STEERING FOR SUPER-RESOLUTION/LIGHTFIELD IMAGERY

(71) Applicant: Google Inc., Mountain View, CA (US)

(72) Inventors: John D. Perreault, Mountain View, CA (US); Johnny Lee, Mountain View, CA (US); Jerry Carollo, San Francisco, CA (US)

(73) Assignee: Google LLC, Mountain View, CA (US)

( * ) Notice: Subject to any disclaimer, the term of this patent is extended or adjusted under 35 U.S.C. 154(b) by 0 days.

(21) Appl. No.: 15/073,199

(22) Filed: Mar. 17, 2016

(65) Prior Publication Data

US 2017/0270637 A1    Sep. 21, 2017

(51) Int. Cl.
*H04N 5/222* (2006.01)
*G06T 3/40* (2006.01)
(Continued)

(52) U.S. Cl.
CPC .......... *G06T 3/4053* (2013.01); *G02B 26/106* (2013.01); *G02B 27/0172* (2013.01); *G02B 27/30* (2013.01); *H04N 5/23232* (2013.01)

(58) Field of Classification Search
CPC .... G02B 2027/0178; G02B 2027/0187; G02B 27/0093; G02B 27/0172; G02B 27/0179; G02B 27/30; G02B 3/0056; G02B 3/0062; G02B 5/1842; G02F 1/13306; G02F 2001/294; G02F 2203/24; G06F 3/0346
See application file for complete search history.

(56) References Cited

U.S. PATENT DOCUMENTS

| 4,383,170 A | 5/1983 | Takagi et al. |
| 6,421,109 B1 | 7/2002 | Popovich |

(Continued)

FOREIGN PATENT DOCUMENTS

| EP | 0889644 | 7/1999 |
| WO | 0045608 | 8/2000 |

(Continued)

OTHER PUBLICATIONS

U.S. Appl. No. 81/442,669, filed Mar. 27, 2012, Handschy.

(Continued)

*Primary Examiner* — Trung Diep

(57) ABSTRACT

A near-eye display system includes a display panel, a beam steering assembly facing the display panel, a display controller, and a beam steering controller. The beam steering assembly imparts one of a plurality of net deflection angles to incident light. The display controller drives the display panel to display a sequence of images, and the beam steering controller controls the beam steering assembly to impart a different net deflection angle for each displayed image of the sequence. The sequence of images, when displayed within the visual perception interval, may be perceived as a single image having a resolution greater than the resolution of the display panel or having larger apparent pixel sizes that conceal the black space between pixels of the display, or the sequence of images may represent a lightfield with the angular information represented in the net deflection angles imparted into the images as they are projected.

25 Claims, 6 Drawing Sheets

(51) Int. Cl.
   *H04N 5/232*   (2006.01)
   *G02B 27/01*   (2006.01)
   *G02B 26/10*   (2006.01)
   *G02B 27/30*   (2006.01)

(56) References Cited

U.S. PATENT DOCUMENTS

| | | | |
|---|---|---|---|
| 8,767,145 B1* | 7/2014 | Zhang | G02F 1/13471 349/114 |
| 8,817,350 B1 | 8/2014 | Robbins et al. | |
| 2009/0174918 A1 | 7/2009 | Zhuang et al. | |
| 2010/0103485 A1* | 4/2010 | Haussler | G03H 1/02 359/9 |
| 2011/0211097 A1 | 9/2011 | Omani | |
| 2013/0222384 A1 | 8/2013 | Futterer | |
| 2014/0104665 A1 | 4/2014 | Popovich et al. | |
| 2015/0212326 A1 | 7/2015 | Kress et al. | |
| 2015/0234102 A1 | 8/2015 | Kurzweg et al. | |
| 2015/0235465 A1* | 8/2015 | Schowengerdt | G06T 19/006 345/633 |
| 2017/0061838 A1* | 3/2017 | Shi | G02B 5/30 |

FOREIGN PATENT DOCUMENTS

| | | |
|---|---|---|
| WO | 2007072230 A1 | 6/2007 |
| WO | 2014180554 A1 | 11/2014 |
| WO | 2016004998 | 1/2016 |

OTHER PUBLICATIONS

Hornbeck, Larry J., "Digital Light Processing for HighBrightness, HighResolution Applications", Texas Instruments Digital Video Operations, May 8, 1997, 16 pages.

Komanduri, R. K., et al., "Polarization-independent modulation for projection displays using small-period LC polarization gratings", Journal of the Society for Information Display, 2007, vol. 15, No. 8, pp. 589-594 pages.

Suck, J., et al., "Polarization Gratings for Non-mechanical Beam Steering Applications", Boulder Nonlinear Systems, May 15, 2012, 7 pages.

International Search Report and Written Opinion correlating to PCT/US2016/067990 dated Jul. 21, 2017, 27 pages.

Crawford, G.P., "Electrically Switchable Bragg Gratings", Optics & Photonics, Apr. 2013, 6 pages.

Invitation to Pay Additional Fees and, Where Applicable, Protest Fee and Partial Search Report correlating to PCT/US2016/067990 dated Mar. 17, 2017, 8 pages.

* cited by examiner

ELECTRO-OPTIC BEAM STEERING FOR SUPER-RESOLUTION/LIGHTFIELD IMAGERY

FIELD OF THE DISCLOSURE

The present disclosure relates generally to imagery systems and more particularly to near-eye display systems and image capture systems.

BACKGROUND

A challenge to the development of head mounted displays (HMDs) and other near-eye display devices is the limited pixel density of current displays. Of particular issue in organic light emitting diode (OLED)-based displays and other similar displays is the relatively low pixel fill factor; that is, the relatively large degree of "black space" between pixels of the OLED-based display. While this black space is normally undetectable for displays at greater than arm's length from the user, in HMDs and other near-eye displays this black space may be readily detectable by the user due to the close proximity of the display to the user's eyes. The resulting relatively coarse image resolution offered by conventional displays typically interferes with user immersion in the virtual reality (VR) or augmented reality (AR) experience. Moreover, the overall length of the optical system required to magnify the display for wide field-of-view (FOV) near-eye viewing often results in HMDs having a significant protrusion from the user's head, which can cause physical discomfort to the user, as can the vergence-accommodation conflict of conventional stereoscopic displays.

BRIEF DESCRIPTION OF THE DRAWINGS

The present disclosure may be better understood by, and its numerous features and advantages made apparent to, those skilled in the art by referencing the accompanying drawings. The use of the same reference symbols in different drawings indicates similar or identical items.

DETAILED DESCRIPTION

Figure 1:
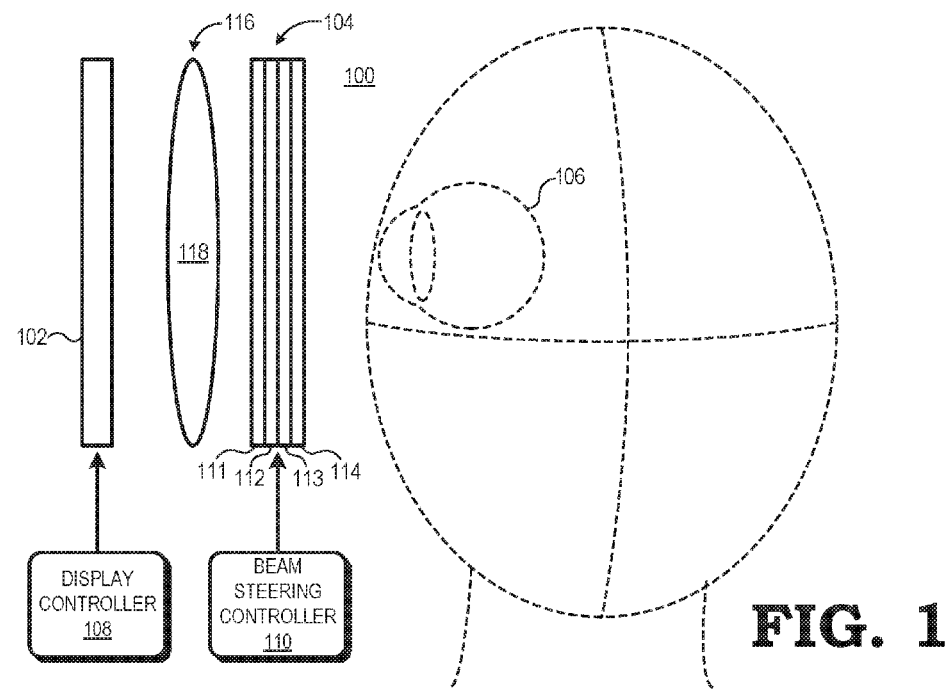
FIG. 1 is a diagram illustrating an arrangement of components of near-eye display system utilizing an electro-optical beam steering assembly to project imagery in accordance with at least one embodiment of the present disclosure.

The following description is intended to convey a thorough understanding of the present disclosure by providing a number of specific embodiments and details involving near-eye display systems and image capture systems. It is understood, however, that the present disclosure is not limited to these specific embodiments and details, which are examples only, and the scope of the disclosure is accordingly intended to be limited only by the following claims and equivalents thereof. It is further understood that one possessing ordinary skill in the art, in light of known systems and methods, would appreciate the use of the disclosure for its intended purposes and benefits in any number of alternative embodiments, depending upon specific design and other needs.

FIGS. 1-12 illustrate example systems and techniques for providing electro-optical beam-steering in a near-eye display system or imaging system. As described with reference to FIGS. 1-9 below, a head mounted display (HMD) or other near-eye display system implements an electro-optical beam steering assembly disposed between a display panel and a user's eye. The beam steering assembly can be utilized to enhance the resolution of the display panel or to compensate for the "screen-door" effect using a time-multiplexed approach to displaying a sequence or two or more images that are perceived as a higher-resolution image by the user through exploitation of the visual persistence effects of the human eye and the pixel sparsity of OLED-based displays and other similar displays. In some implementations, the near-eye display system projects time-multiplexed images at a higher display rate such that two or more of the images having different visual information are effectively combined by the human visual perception system into a single "super-resolution" image; that is, an image with an effective resolution higher than the native resolution of the display panel. In other implementations, the near-eye display system projects time-multiplexed images at a lower display rate such that two or more adjacent images having the same visual information but spatially shifted via the beam steering apparatus relative to each other are perceived by the user as an image with light emitting elements of increased apparent size, and thus effectively covering the "black space" between the light emitting elements of the display. In still other implementations, the near-eye display system is implemented as a lightfield display system, and thus the near-eye display system utilizes the time-multiplexed image projection afforded by the beam steering assembly to provide a lightfield display with improved resolution compared to the resolution otherwise afforded by the display panel using conventional lightfield display techniques.

Further, as described below with reference to FIGS. 10-12, an image capture system may implement an electro-optical beam steering assembly disposed between an image sensor and the subject of image capture. Similar to the processes of the display systems described herein, the image capture system may use the beam steering device to capture a sequence of images that either may be combined into a single super-resolution image (that is, an image having an effective resolution that is higher than the native resolution of the image sensor) or utilized to generate a captured lightfield with improved resolution compared to the resolution otherwise afforded by the image sensor using conventional lightfield capture techniques.

FIG. 1 illustrates a near-eye display system 100 for implementation in a head mounted device (HMD), heads-up display, or similar device in accordance with at least one embodiment. As depicted, the near-eye display system 100 includes a display panel 102, a beam steering assembly 104 disposed between the display panel 102 and at least one eye 106 of a user, a display controller 108 to control the display panel 102, and a beam steering controller 110 to control the operation of the beam steering assembly 104. The display panel 102 is used to display imagery to at least one eye 106 of a user in the form of a normal image (for super-resolution implementations) or a lightfield (for lightfield implementations).

The beam steering assembly 104 comprises a stack of one or more beam steering stages, each beam steering stage comprising a non-mechanical electro-optical beam steering device, such as the four stages in the illustrated example stack of FIG. 1, which comprises beam steering devices 111, 112, 113, 114 (although more than four or fewer than four beam steering devices may be used in other implementations). Each beam steering device is configurable in at least two modes: an inactivated mode in which incident light is passed though the beam steering device without deflection (or with minimal deflection); and an activated mode in which incident light is deflected in a quantized (digital) manner as the light passes through the beam steering device, with the particular direction of deflection dependent on the orientation of the beam steering device. Thus, because the angles of deflection of the beam steering devices are additive, the stack of beam steering devices may be arranged in any of a number of configurations, each configuration having a different, discrete net deflection angle that depends on the orientations of the beam steering devices within the stack and depends on which beam steering devices within the stack are activated and which are inactivated at that time. Thus, the number of net deflection angles that may be achieved by the beam steering assembly 104 is $DN=2^{(N+1)}$, where DN represents the number of net deflection angles and N represents the number of stages/beam steering devices within the stack (e.g., N=4 for the example of FIG. 1). As described in greater detail herein, the near-eye display system 100 utilizes the programmable, quantized net deflection angles that may be achieved by the beam steering assembly 104 to deflect, or "shift" the position of successive images displayed at the display panel 102 so as to project to the user a super-resolution image, an image with pixels of a perceived larger size so as to effectively conceal the black space between pixels, or a higher-resolution lightfield due to the succession of images effectively being superimposed due to the visual persistence effect of the human visual system.

The beam steering devices 111-114 may be implemented as any of a variety of suitable electro-optical beam steering devices. One such example device includes a liquid-crystal polarizing-grating (LCPG) device. LCPG devices are comprised of thin birefringent films that steer light to one of two deflection angles, depending on the polarization handedness of the input light. LCPG devices use polarization modulation instead of phase or amplitude modulation, resulting in high diffraction efficiency (often greater than 99%) over a large range of input wavelengths (420-800 nm) and incidence angles as they operate on the dipole emission-angle of the LC modules, rather than the optical path length difference used in typical LC devices. When an active LCPG device is switched on, its grating structure disappears, resulting in a third undeflected and unpolarized light path. As noted above, as each LCPG device in a stack can be switched off, added, or subtracted from the net deflection, a relatively small stack of LCPG devices can provide a large set of net deflection angles, enabling a wide range of deflection angles in two dimensions to be achieved with a small number of stack elements. However, LCPG devices typically require circular polarized input light to operate effectively, and thus the near-eye display system 100 further may include a lens assembly 116 comprising one or more collimating lenses 118 (or a microlens array) between the display panel 102 and the beam steering assembly 104 so as to polarize and collimate the light emitted by the display panel 102 before it impinges on the surface of the LCPG device closest to the display panel 102. It should be noted that while embodiments implementing LCPG devices as the beam steering devices of the beam steering assembly 104 are described below for illustrative purposes, other suitable beam steering devices may be implemented in place of the LCPG devices unless otherwise noted.

Figure 2:
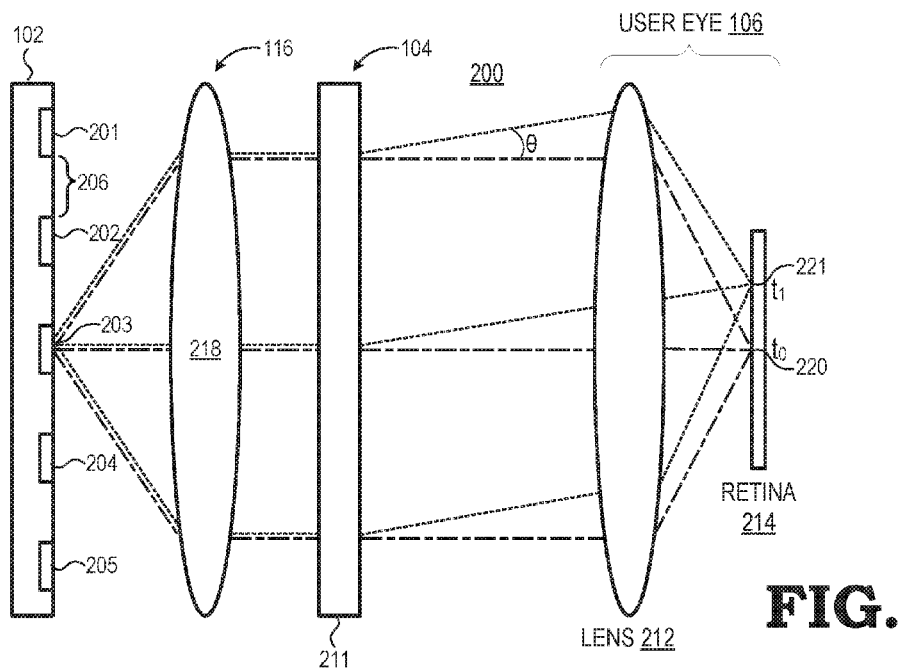
FIG. 2 is a diagram illustrating a cross-section view of a super-resolution implementation of the near-eye display system of FIG. 1 in accordance with at least one embodiment of the present disclosure.

FIG. 2 illustrates a cross-section view of an implementation 200 of the near-eye display system 100 for providing super-resolution imagery to the eye 106 of the user in accordance with at least one embodiment of the present disclosure. In this example, the display panel 102 comprises an array of pixels, which typically are arranged as an interwoven pattern of sub-pixels of different colors, such as red, green, and blue (RGB) sub-pixels, and wherein the spatial persistence effects of human vision result in adjacent sub-pixels of different colors to be perceived as a single pixel having a color represented by a blend of the adjacent sub-pixels and their respective intensities. For ease of illustration, the display panel 102 is depicted as having only five sub-pixels in the cross-section (sub-pixels 201, 202, 203, 204, 205), whereas a typical display would have hundreds or thousands of sub-pixels along the cross-section, and thus it will be appreciated that the dimensions of the sub-pixels 201-205, and the black space in between the sub-pixels (e.g., black space 206 between subpixels 201 and 202) is significantly exaggerated relative to the other components of the implementation 200. Further, to aid in illustration of the operation of the beam steering assembly 104, the implementation 200 of FIG. 2 illustrates the beam steering assembly 104 as having only a single stage in the form of beam steering device 211. Moreover, in FIG. 2, the user's eye 106 is depicted as a lens 212 representing the lens of the eye 106 and a panel 214 representing the retina of the eye 106. As such, the panel 214 is also referred to herein as "retina 214". Further, the lens assembly 116 is depicted as a single collimating lens 218 (corresponding to lens 118 of FIG. 1). It also should be noted that while FIG. 2 depicts a relatively simple optical system configuration with a single lens and the beam steering assembly 104 between the display panel 102 and the eye 106, in a typical implementation the optical system may comprise a larger number of lenses, prisms, or other optical elements between the display panel 102 and the eye 106. In such cases, the beam steering assembly 104 may be implemented at any point in the optical system where light is nearly collimated (e.g., at a point in a longer optical relay system where there is an intermediate image of the stop or pupil).

In the depicted configuration of FIG. 2, the beam steering assembly 104 is configurable to impart one of two net deflection angles: a non-zero deflection angle (denoted "θ" in FIG. 2) when the beam steering device 211 is activated, and a zero deflection angle (that is, passes incident light with substantially no deflection) when the beam steering device 211 is not activated. Accordingly, the near-eye display system 100 can utilize this configuration to exploit the pixel sparsity of the display panel 102 along with the visual persistence of the human eye (approximately 100 Hz) to update the displayed pixel information for each of the sub-pixel locations twice within the visual persistence interval (approximately 10 ms), and thus create a perception of a display having an effective resolution of approximately twice the actual resolution of the display panel 102.

To illustrate, at time t0, the beam steering controller 110 deactivates the beam steering device 211 and the display controller 108 scans in a first image for display by the display panel 102. The resulting light output by the display panel 102 for this first image is collimated by the lens 218 and directed to the panel-facing surface of the beam steering device 211. Because the beam steering device 211 is deactivated at this time (that is, the beam steering device 211 has a configuration that imparts a zero-angle deflection at time t0), the incident light is passed without substantial deflection to the user's eye 106, whereupon the lens 212 of the eye 106 focuses the light from the beam steering device 211 on the retina 214. To illustrate, the light emitted by the pixel 203 is collimated and passed without substantial deflection to point 220 on the retina 214 (with light from the other pixels taking corresponding paths). Thereafter, and within the visual persistence interval, at time t1 the beam steering controller 110 activates the beam steering device 211 (that is, places the beam steering device 211 in different configuration that imparts the illustrated deflection angle θ), and the display controller 108 scans in a second image for display by the display panel 102 at time t1 (where the second image may have the same visual content as the first image or may have "new" or different image content). The resulting light output by the display panel 102 for this second image is collimated by the lens 218 and directed to the panel-facing surface of the beam steering device 211. As the beam steering device 211 is activated at this time, the incident light is deflected by the deflection angle θ. The deflected light is focused by the lens 212 of the eye to a shifted position with respect to the retina 214. To illustrate, the light emitted by the pixel 203 is collimated and then deflected by deflection angle θ, with the result that the lens 212 focuses the resulting deflected light from the pixel 203 to position 221 on the retina 214, rather than the original position 220. As both images were displayed within the visual persistence interval, and as the sub-pixels of the second image where shifted, the human visual system perceives the two images as overlapping and thus either as a single super-resolution image having a resolution that is approximately double the actual resolution of the display panel 102 (if the second image had different visual content) or as a single image of the same resolution of the first and second images but with larger perceived "pixels" that effectively conceal the black space between pixels of the display panel 102 and thus reduce or eliminate the screen-door effect of this black space. That is, in this example the deflection angle θ introduced into the shifted second image has the result of presenting the sub-pixels of the second image where the black spaces would have appeared to the eye 106 from the display of the first image, and thus the sub-pixels of the second image appear to the eye 106 to occupy, or "cover up", the black-spaces in the first image, and thus reduce or eliminate the user's ability to perceive these black spaces in the display panel 102.

Figure 3:
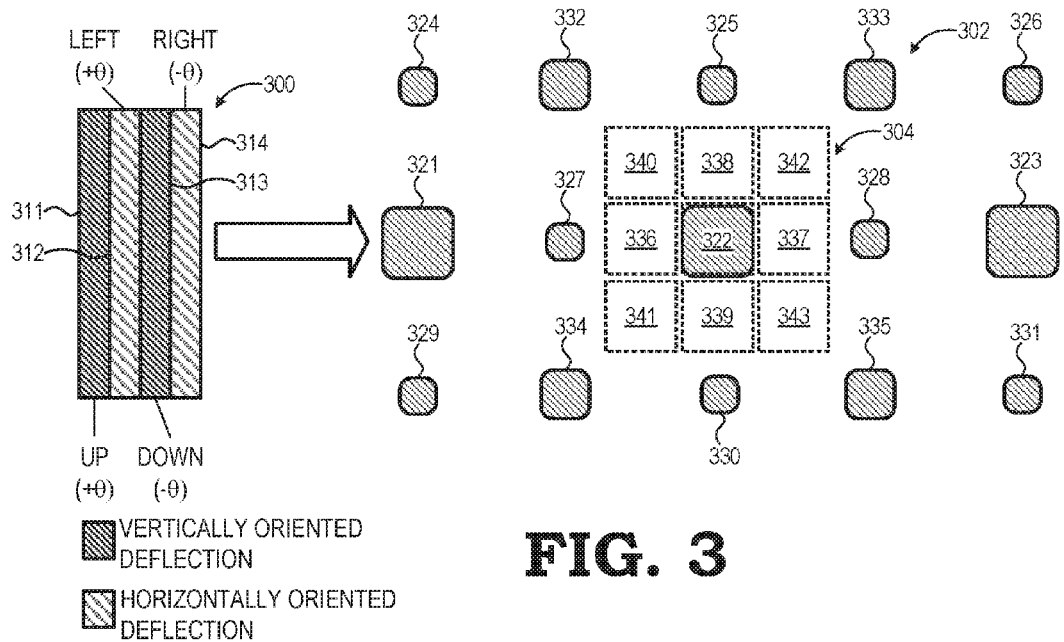
FIG. 3 is a diagram illustrating an example pixel shift pattern provided by the near-eye display system of FIG. 2

Although implementation 200 of the near-eye display device 100 depicts a beam steering apparatus 104 having a single beam steering device for binary beam deflection, as noted above the beam steering apparatus 104 may employ a stack of multiple beam steering devices in alternating or otherwise different orientations so as to provide multiple different net angles of deflection, and thus provide the option to shift multiple successive images in different directions. FIG. 3 illustrates an example four-device stack 300 for the beam steering apparatus 104 and the corresponding possible sub-pixel shift pattern provided by this configuration.

In the example of FIG. 3, each of four beam steering devices 311, 312, 313, 314 of the stack 300 imparts a deflection angle θ to incident light when activated, with the direction of the deflection angle being based on the particular orientation of the beam steering device. For example, in FIG. 3 each beam steering device is oriented at 90 degrees relative to the other beam steering devices of the stack 300, such that beam steering device 311, when activated, introduces an upward deflection angle, beam steering device 313 introduces a downward deflection angle, beam steering device 312 introduces a deflection angle to the left, and beam steering device 314 introduces a deflection angle to the right. As such, depending on which of the beam steering devices 311-314 are activated (that is, depending on the current configuration of the stack 300), the stack 300 can shift any given pixel to one of nine ($2^{(4-1)}$) positions, including the original sub-pixel position (i.e., all four beam steering devices deactivated so that light passes through without notable deflection).

For example, FIG. 3 also illustrates a sub-pixel array 302 of an example OLED-based implementation of the display panel 102, which includes red sub-pixels 321, 322, 323, green sub-pixels 324, 325, 326, 327, 328, 329, 330, 331, and blue sub-pixels 332, 333, 334, 335. With reference to red pixel 332 by way of example, the stack 300 provides a corresponding sub-pixel shift pattern 304 having nine potential shift positions for the red pixel 332: the original position of the red pixel 332 (that is, all of beam steering devices 311-314 deactivated); left shift position 336 (device 312 activated, devices 311, 313, 314 deactivated); right shift position 337 (device 314 activated, devices 311-313 deactivated); up shift position 338 (device 311 activated, devices 312-314 deactivated); down shift position 339 (device 313 activated, devices 311, 312, 314 deactivated); up-left shift position 340 (devices 311, 312 activated, devices 313, 314 deactivated); down-left shift position 341 (device 312 activated, devices 311, 313, 314 deactivated); up-right position 342 (devices 311, 314 activated, devices 312, 313 deactivated); and down-right shift position 343 (devices 313, 314 activated, devices 311, 312 deactivated). While only the potential sub-pixel shift pattern 304 for the red sub-pixel 322 is depicted in FIG. 3 for clarity purposes, it will be appreciated that the particular activation/deactivation configuration of the stack 300 will introduce a similar corresponding sub-pixel shift pattern for the other sub-pixels of the sub-pixel array 302, as well as the other sub-pixels of the display panel 102 as a whole.

As illustrated by the sub-pixel shift pattern 304, the red sub-pixel 322 may be shifted to any of eight additional positions, which in the example of FIG. 3 occupy the black space between the red sub-pixel and its adjacent sub-pixels. As such, assuming the near-eye display system 100 can drive the display panel 102 at a sufficient frame rate, up to nine images may be time-multiplexed for display during the visual persistence interval, and thus causing the user to perceive a super-resolution image having a resolution of up to nine times the resolution of the display panel 102, while also substantially covering the black space between the sub-pixels of the sub-pixel array 302 from perception by the user, or to perceive an image of the same resolution as the display panel 102, albeit with reduced or eliminated perception of the black space between the pixels of the display panel 102 that would otherwise be discernable at the near-eye viewing distance.

Figure 4:
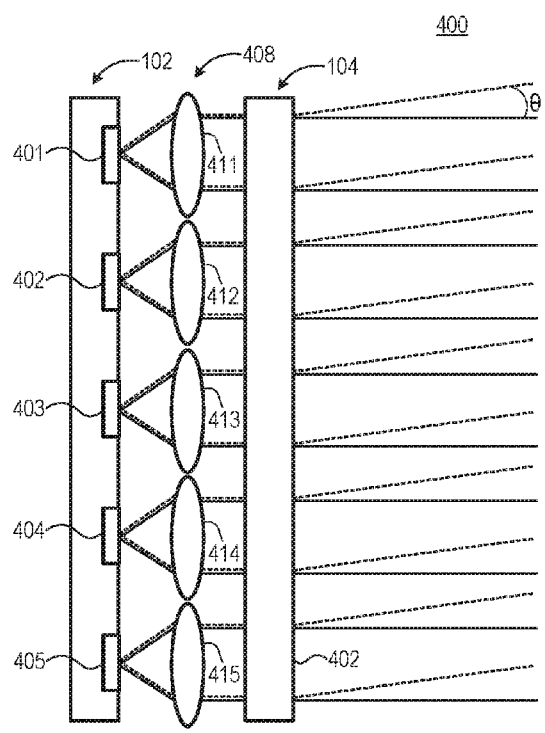
FIG. 4 is a diagram illustrating a cross-section view of a lightfield-based implementation of the near-eye display system of FIG. 1 in accordance with at least one embodiment of the present disclosure.

FIG. 4 illustrates a cross-section view of an implementation 400 of the near-eye display system 100 for providing lightfield imagery to the eye 106 (not shown in FIG. 4) of the user in accordance with at least one embodiment of the present disclosure. Conventional lightfield displays use a super-pixel array to represent the intensity and angular information of a lightfield distribution. When implemented with a microlens array, such lightfield displays often provide improved convergence, accommodation, and binocular disparity, although at the expense of decreased spatial resolution due to the need to encode angular information in the displayed imagery itself. This decreased spatial resolution makes the image appear even more pixilated to the user, as well as making the black space between sub-pixels more prominent in near-eye implementations. This reduction in spatial resolution is particularly problematic in AR and VR applications, which are already impacted by lower resolutions due to the magnification of the displays as often found in such applications. The implementation 400 utilizes the time-multiplexed image display process within the visual perception interval as afforded by the electro-optical beam steering of the beam steering assembly 104 so as to encode lightfield information without sacrificing spatial resolution; that is, to provide a lightfield display with a higher effective resolution than otherwise would be achieved for a display panel of a certain resolution.

The display panel 102 in the implementation 400 of FIG. 4 comprises an array of pixels arranged as sub-pixel arrays. For ease of illustration, the display panel 102 is depicted as having only five sub-pixels in the cross-section (sub-pixels 401, 402, 403, 404, 405) with exaggerated dimensions relative to the other illustrated components, as similarly noted above with reference to the implementation 200 of FIG. 2. Further, to aid in illustration of the operation of the beam steering assembly 104, the implementation 400 of FIG. 4 illustrates the beam steering assembly 104 as having only a single beam steering device 406. Moreover, as the display panel 102 is used as a lightfield display in implementation 400, the lens assembly 116 in implementation 400 composed of an array 408 of microlenses aligned with the sub-pixels, such as microlenses 411, 412, 413, 414, 415.

Figure 5:
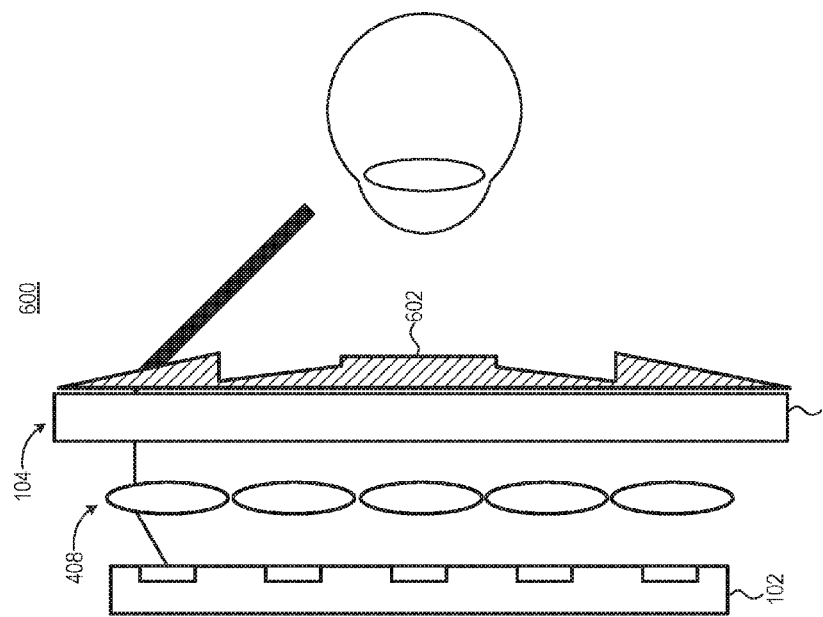
FIG. 5 is a cross-section view of an implementation of the near-eye display system of FIG. 1 incorporating narrow FOV angular dispersion compensation in accordance with at least one embodiment of the present disclosure.
Figure 6:
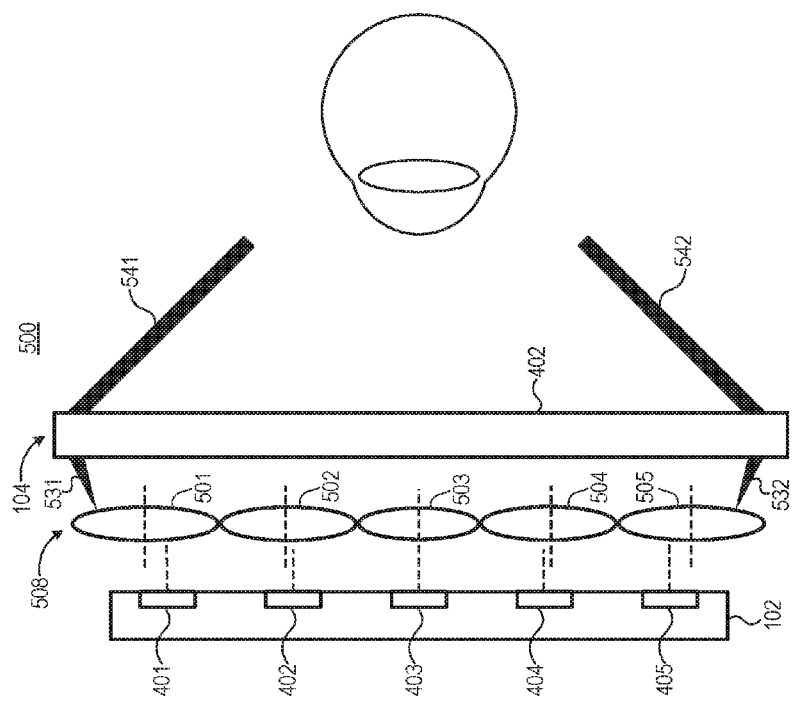
FIG. 6 is a cross-section view of an implementation of the near-eye display system of FIG. 1 incorporating wider FOV angular dispersion compensation in accordance with at least one embodiment of the present disclosure.

So as to readily illustrate the general operational principles, the beam steering assembly 104 in the example of FIG. 4 provides a deflection angle θ when the beam steering device 402 is activated, and passes incident light with substantially no deflection when the beam steering device 402 is not activated. However, in a more likely implementation, the beam steering assembly 104 would implement a stack of multiple beam steering devices so that the net deflection angle of the beam steering assembly 104 may be configured or programmed to one of a larger set of different net deflection angles. As such, rather than encoding the angular information in the lightfield imagery scanned into the display panel 102, the time-multiplexing of imagery via the beam steering device 104 may be employed to encode the angular information via the deflection angles provided by the steering assembly 104 over a sequence of two or more images displayed during the visual persistence interval. That is, the beam steering device 104 may be used, in effect, to "encode" the angular information into the imagery being displayed, rather than via encoding of the imagery itself. As such, a lightfield display may be provided at a higher resolution (and potentially at the native resolution of the display panel 102) compared to conventional lightfield displays that must sacrifice resolution due to encoding of the angular information within the imagery itself In addition to high pixel density, VR and AR near-eye displays typically require a large FOV to effectively provide an immersive experience. As noted above, the beam steering devices of the beam steering assembly 104 may be implemented as LCPG devices, which operate on the principle of diffraction, and thus will introduce angular dispersion (that is, separation of light rays of different wavelengths) as the incident light is deflected. In some embodiments, the coarse effect of this angular dispersion can be avoided by time-multiplexing the different color fields (e.g., RGB) of the image being displayed. However, even under this approach there may be a dispersive effect due to the finite wavelength bandwidth of the light sources constituting the display panel 102. For relatively small angles in LED-based light sources, the angular dispersion is negligible. However, for larger FOV implementations, the angular dispersion introduced by the LCPG devices may require some form of compensation in order to help ensure an accurate depiction of the imagery to the user. FIGS. 5 and 6 illustrate two different configurations for achromatizing a LCPG-based lightfield implementation of the near-eye display system 100 for intermediate FOVs (e.g., 20 degrees or less) and larger FOVs (e.g., more than 20 degrees), respectively. Both approaches employ refractive dispersion introduced by shifted microlenses or addition of a Fresnel lens or microprism array to at least partially cancel out the diffractive dispersion introduced by the LCPG devices or other similar devices of the beam steering assembly 104.

In the implementation 500 of the near-eye display system 100 depicted in FIG. 5, the configuration of the lightfield-based implementation 400 is modified such that the optical axes of the microlenses of a stretched microlens array 508 disposed between the display panel 102 and the beam steering assembly 104 gradually shift relative to the corresponding sub-pixel the further the corresponding microlens is from the center of the display panel 102 (that is, the greater the field angle for the microlens). To illustrate, assuming sub-pixel 403 is at the center of the display panel 102, the corresponding microlens 503 has an optical axis that is substantially aligned with the axis of the sub-pixel 403. However, as sub-pixels 402 and 404 are offset from the center of the display panel 102, the corresponding microlenses 502, 504 are stretched and/or shifted such that their optical axes are slightly offset from the axes of the sub-pixels 402, 404, respectively. Further, as sub-pixels 401 and 405 are even further offset from the center of the display panel 102, the corresponding microlenses 501, 505 are stretched and/or shifted such that their optical axes are further offset from the axes of the subpixels 401, 405, respectively. As a result, as the field angle increases, the refractive dispersion introduced by the corresponding microlens increases (as represented by marginal rays 531, 532 in FIG. 5), which in turn at least partially cancels out the diffractive dispersion introduced by the LCPG-based beam steering device 402.

It should be noted that this approach results in a relatively small (e.g., approximately 10 um) displacement of the rays after angular dispersion correction at extreme field angles. This displacement is represented by the thickness of the angular-dispersion-corrected rays 541, 542 of FIG. 5. Moreover, the shifted microlens array configuration is limited by the acceptance angle (typically about 20 degrees) of the LCPG-based beam steering device 402.

FIG. 6 illustrates an alternative implementation 600 of the near-eye display system 100 for angular-dispersion correction in which the normal, or non-shifted, microlens array 408 is maintained, and a compensatory refractive structure 602 in the form of a Fresnel lens (shown) or microprism array is employed at the eye-facing surface of the LCPG-based beam steering device 402 closes to the eye 106 of the user. While the shifted-microlens array implementation of FIG. 5 compensated for diffractive dispersion by introducing compensatory refractive dispersion into the light incident on the LCPG-based beam steering assembly 104, the implementation 600 compensates for diffractive dispersion by introducing compensatory refractive dispersion into the diffractively-dispersed light exiting the LCPG-based beam steering assembly 104. As a result, the refractive-element-based angular dispersion correction configuration of FIG. 6 may accommodate a larger FOV than the implementation 500 of FIG. 5.

Figure 7:
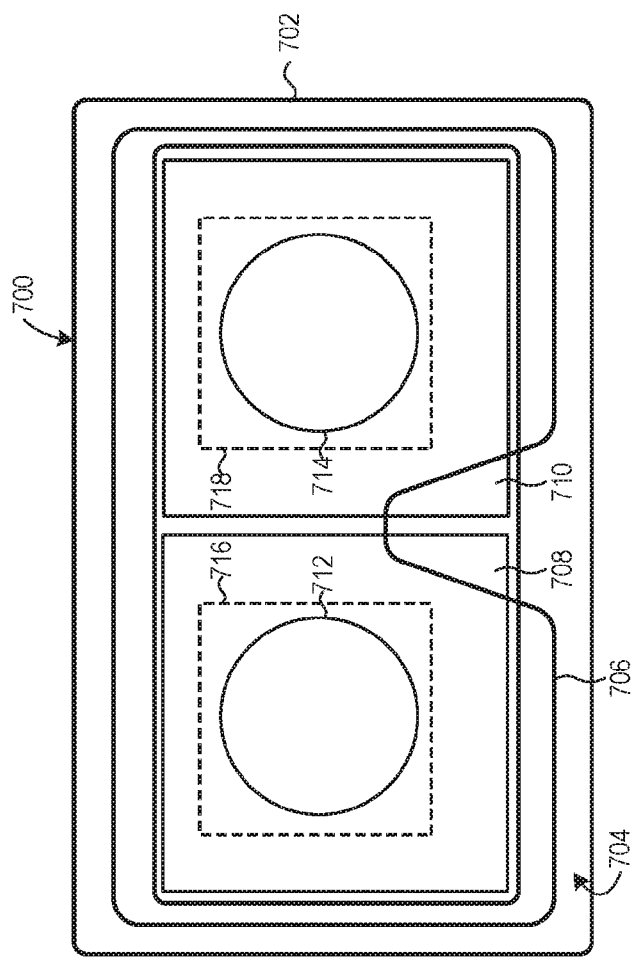
FIG. 7 is a diagram illustrating a rear view of an HMD device implementing the near-eye display system of FIG. 1 in accordance with at least one embodiment of the present disclosure.

FIG. 7 illustrates an example HMD device 700 configured to implement the near-eye display system 100 in accordance with at least one embodiment. The HMD device 700 is mounted to the head of the user through the use of an apparatus strapped to, or otherwise mounted on, the user's head such that the HMD device 700 is fixedly positioned in proximity to the user's face and thus moves with the user's movements. However, in some circumstances a user may hold a tablet computer or other hand-held device up to the user's face and constrain the movement of the hand-held device such that the orientation of the hand-held device to the user's head is relatively fixed even as the user's head moves. In such instances, a hand-held device operated in this manner also may be considered an implementation of the HMD device 700 even though it is not "mounted" via a physical attachment to the user's head.

The HMD device 700 comprises a housing 702 having a surface 704, and a face gasket 706 and set of straps or a harness (omitted from FIG. 7 for clarity) to mount the housing 702 on the user's head so that the user faces the surface 704 of the housing 702. In the depicted embodiment, the HMD device 700 is a binocular HMD and thus has a left-eye display 708 and a right-eye display 710 disposed at the surface 704 (with displays 708, 710 collectively or separately representing an embodiment of the display panel 102). The displays 708, 710 may be implemented as separate display panels (that is independent display arrays driven by separate display driver hardware components) or the displays 708, 710 may be implemented as logically-separated regions of a single display panel (e.g., a single display array logically divided into left and right "halves"). The housing 702 further includes an eyepiece lens 712 aligned with the left-eye display 708 and an eyepiece lens 714 aligned with the right-eye display 710. Alternatively, in some embodiments, the HMD device 700 may be implemented as a monocular HMD in that a single image is presented to both eyes of the user, either through left and right eyepiece lenses 712, 714, or directly without an intervening lens.

In the depicted example, the HMD device 300 further includes a separate implementation of the beam steering configuration for each eye, and thus includes a beam steering assembly 716 disposed between the lens 712 and the display 708 for the left eye and a beam steering assembly 718 disposed between the lens 714 and the display 710 for the right eye (with the beam steering assemblies 716, 718) comprising embodiments of the beam steering assembly 104 of FIG. 1). Alternatively, in other embodiments, a single beam steering assembly is employed and spans both displays 708, 710.

Figure 8:
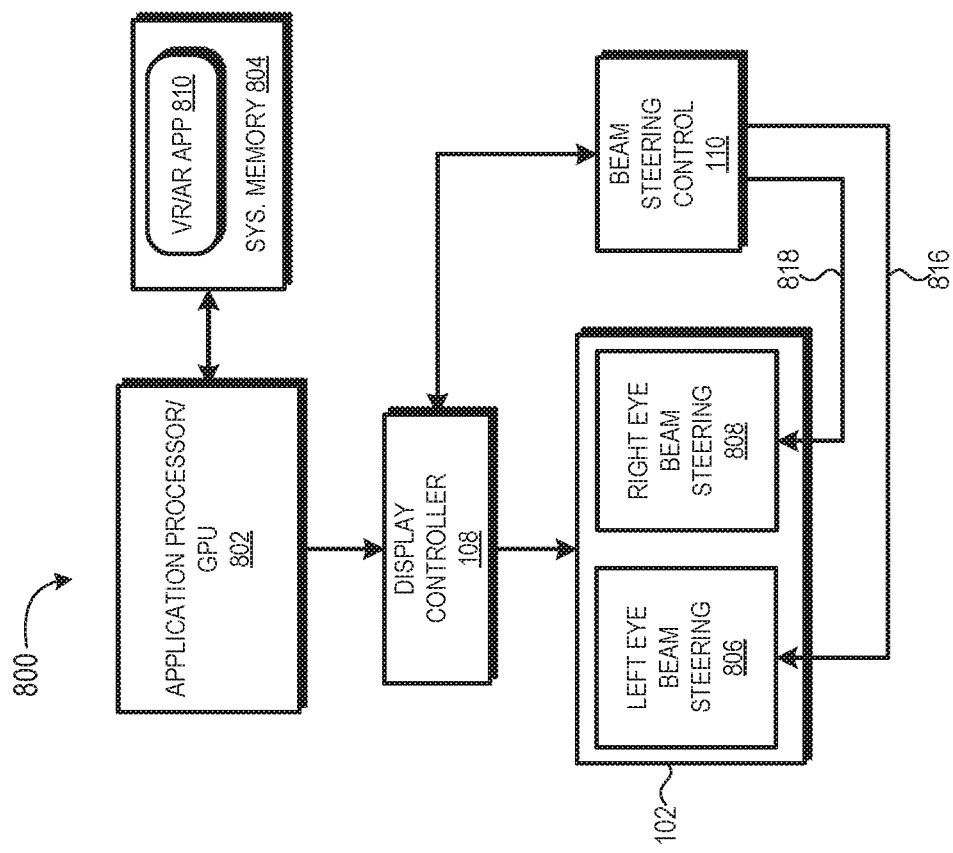
FIG. 8 is a diagram illustrating a processing system of the near-eye display system of FIG. 1 in accordance with at least one embodiment of the present disclosure.

FIG. 8 illustrates an example processing system 800 of near-eye display system 100 in accordance with some embodiments. The processing system 800 includes an application processor 802, a system memory 804, the display controller 108, the beam steering controller 110, the display panel 102, and beam steering assemblies 806, 808 (corresponding to the beam steering assemblies 716, 718 of FIG. 7) for the left eye and right eye of a user, respectively. The application processor 404 comprises one or more central processing units (CPUs), graphics processing units (GPUs), or a combination of one or more CPUs and one or more GPUs. The Snapdragon™ 810 MSM8994 system-on-a-chip (SoC) from Qualcomm Incorporated is an example of a commercially-available implementation of the application processor 404. The display controller 108 may be implemented as, for example, an ASIC, programmable logic, as one or more GPUs executing software that manipulates the one or more GPUs to provide the described functionality, or a combination thereof. Likewise, the beam steering controller 110 may be implemented an ASIC, programmable logic, and the like. In operation, the application processor 802 executes a VR/AR application 810 (stored in, for example, the system memory 804) to provide VR/AR functionality for a user. As part of this process, the VR/AR application 810 manipulates the application processor 802 or associated processor to render a sequence of images for display at the display panel 102, with the sequence of images representing a VR or AR scene. The display controller 108 operates to drive the display panel 102 to display the sequence of images, or a representation thereof As described above, the near-eye display system 100 employs time-multiplexed display of shifted imagery to implement super-resolution imagery, standard-resolution imagery with reduced screen-door effect, or lightfield imagery with improved resolution. To this end, the beam steering controller 110 operates in parallel to the image generation process to configure the beam steering assemblies 806, 808 via configuration signals 816, 818, respectively, to implement identified deflection angles for shifting the imagery displayed at the display panel 102. To illustrate, assuming each of the beam steering assemblies 806, 808 implements a stack of N beam steering stages or devices, the control signals 816, 818 may be implemented as binary values having N bits, with each bit corresponding to a different steering stage and configuring the corresponding steering stage to be either deactivated or activated depending on whether the bit is a "0" or a "1".

Figure 9:
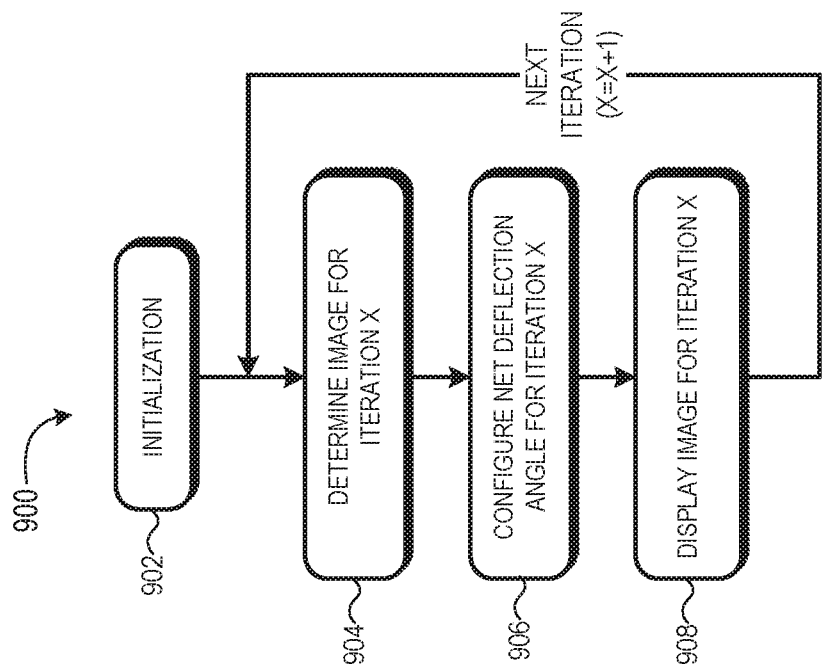
FIG. 9 is a flow diagram illustrating a method for sequential display of images to provide a lightfield display or super-resolution image display in accordance with at least one embodiment of the present disclosure.

FIG. 9 illustrates an example method 900 of operation of the processing system 800 of the near-eye display system 100 for display of super-resolution imagery or lightfield imagery in accordance with at least one embodiment of the present disclosure. As described above, the near-eye display system 100 takes advantage of the visual persistence effect to provide a time-multiplex display of shifted imagery so that either a series of images is perceived by the user as either a single super-resolution image or a standard-resolution image with effectively larger pixels that conceal the black space on the display panel, or so as to encode angular information for a lightfield via the beam steering mechanism, rather than through encoding in the imagery itself. Accordingly, the method 900 initiates at block 902 with the initialization of the near-eye display system 100. When the system 100 is ready to begin generation of imagery for display, the method 900 transitions to iterations of blocks 904, 906, and 908.

At block 904, the VR/AR application 810 determines a display image to be displayed at the display panel 102 for the current (Xth) iteration. The particular image to be displayed depends in part on the net deflection angle to be employed by the beam steering assemblies 806, 808 during the display of the image. For example, if rendering the image from a VR/AR world space in real time, the VR/AR application 810 may render the image based on a display space perspective of the world space that is based in part on the net deflection angle. Alternatively, if generating the image from a pre-generated super-resolution image, the generation of the image at block 904 may include sampling the super-resolution image to generate the display image based on the net deflection angle. Similarly, the net deflection angle may be considered as part of the encoding of angular information in the encoding of a corresponding lightfield image. Further, if implemented for providing standard-resolution imagery with reduced screen-door effect, the same image may be buffered and used to drive the display for two or more display frame periods in sequence.

At block 906, the beam steering controller 110 configures the beam steering assemblies 806, 808 (via control signals 816, 818) to implement the net deflection angle considered during the image generation process of block 904. As explained above, for LCPG-based beam steering devices, this configuration typically includes activating or deactivating a particular combination of stages of the stack comprising the beam steering assembly, such that the particular deflection angles of the activated stage(s) add to the intended net deflection angle. Note that the process of block 906 may be performed concurrently with the corresponding image generation at block 904. With the beam steering assemblies 806, 808 configured for the current iteration, at block 908 the display controller 808 scans the image generated at block 904 into the display panel 102, whereupon the light emitted by the display panel 102 from the display of this image and incident on the panel-facing surfaces of the beam steering assemblies 806, 808, whereupon the incident light is deflected by the corresponding net deflection angle configured at block 906 of the current iteration before exiting the eye-facing surfaces of the beam steering assemblies 806, 808.

The rate of iterations of the process of blocks 904, 906, 908 may be based in part on the number of shifted images to be displayed during the visual persistence interval of the human eye. For example, assuming the visual persistence interval is 10 ms, assuming a 10 us switching time for the beam steering apparatuses 806, 808, and assuming an image for a corresponding net deflection angle can be rendered and displayed at least every 10 us (that is, assuming the display refresh rate is not a bottleneck), up to 100 shifted images may be generated and displayed so as to be perceived as a single super-resolution image, standard-resolution image with reduced screen-door effect, or a high-resolution lightfield by a user.

As demonstrated above, a non-mechanical/electro-optical beam steering assembly may be advantageously used to leverage the visual persistence effect of the human visual system to provide time-multiplexed, spatially shifted images that are perceived by a user as either super-resolution images or a lightfield without significant resolution degradation, depending on implementation. As described below with reference to FIGS. 10-12, this same principle may be implemented in an imaging camera so as to capture a super-resolution image or a lightfield without degraded resolution.

Figure 10:
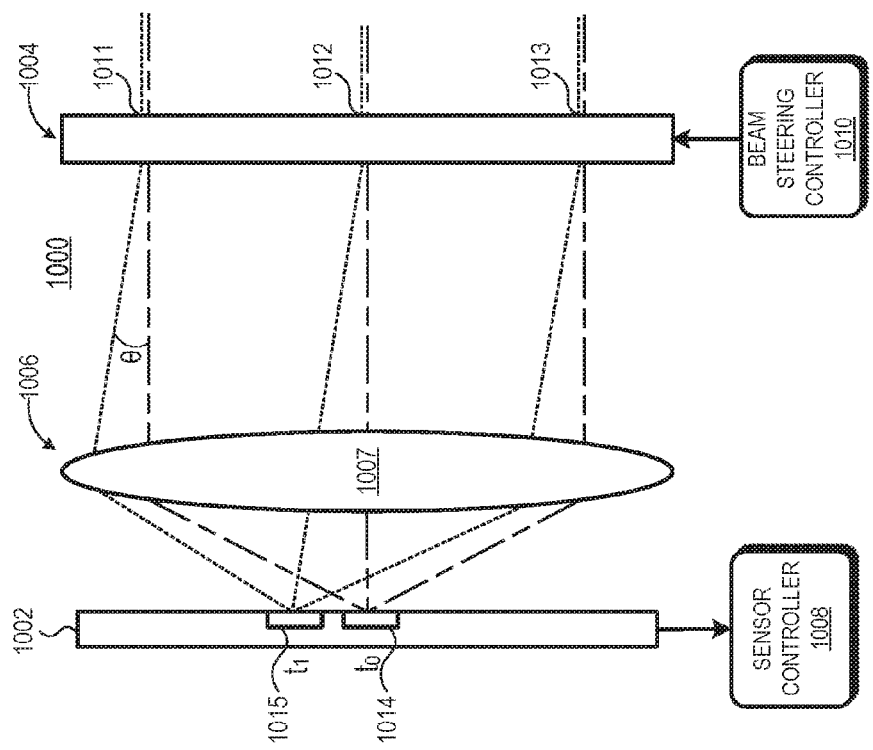
FIG. 10 is a cross-section view of a super-resolution implementation of an image capture system using an electro-optical beam steering assembly in accordance with at least one embodiment of the present disclosure.

FIG. 10 illustrates an implementation of an image capture system 1000 for capturing super-resolution imagery in accordance with at least one embodiment. In the depicted example, the image capture system 1000 includes an image sensor 1002, a beam steering assembly 1004, and a lens assembly 1006 having one or more lenses 1007 disposed between the beam steering assembly 1004 and the image sensor 1002. As with the beam steering assembly 104 of FIG. 1, the beam steering assembly 1004 may include a stack of one or more LCPG-based beam steering devices or other electro-optical beam steering devices, although FIG. 10 depicts only a single beam steering stage for ease of illustration. The image capture system 1000 further includes a sensor controller 1008 and a beam steering controller 1010. As a general operational overview, the image capture system 1000 time-multiplexes the capture of shifted images via beam steering provided by the beam steering assembly 1004 so as to capture a sequence of images which then either may be displayed in the same sequence via the near-eye display system 100 (using the complementary deflection angles during display) or which then may be combined into a single super-resolution image for subsequent processing or display.

To illustrate, FIG. 10 depicts a simpler example whereby two images are captured in sequence and combined to form a single image having a net resolution that is approximately double the resolution of the image sensor 1002. At time t0 the beam steering controller 1010 configures the beam steering assembly 1004 to have a net deflection angle of zero, and thus the light incident on the outward-facing side of the beam steering assembly 1004 is passed without substantial deflection to the lens assembly 1006, whereupon the light is focused on the image sensor 1002 without any shift and the sensor controller 1008 activates the image sensor 1002 at time t0 to capture a first image. To illustrate, the light incident on the beam steering assembly 1004 at points 1011, 1012, 1013 at time t0 ultimately is focused on the pixel sensor 1014 during the first image capture at time to. At time t1, the beam steering controller 110 configures the beam steering assembly 1004 to have a net deflection angle of θ, thus shifting incident light by the angle θ as it passes through the beam steering assembly 1004, and thus resulting in an effective shift in the light as it is focused on the image sensor 1002 by the lens assembly 1006. The sensor controller 1008 activate the image sensor 1002 at time t1 to capture a second image, that is shifted relative to the first image. To illustrate, the light incident on the beam steering assembly 104 at the same points 1011, 1012, 1013 at time t1 ultimately is focused on the pixel sensor 1015 during the second image capture. The two images then may be overlaid or otherwise combined to result in an image with approximately twice the native resolution of the image sensor 1002. Further, in the event that the beam steering assembly 1004 is capable of providing more than one net deflection angle, the time-multiplexed image capture process may be repeated multiple times so as to generate more than two images that may be combined into a super-resolution image.

Figure 11:
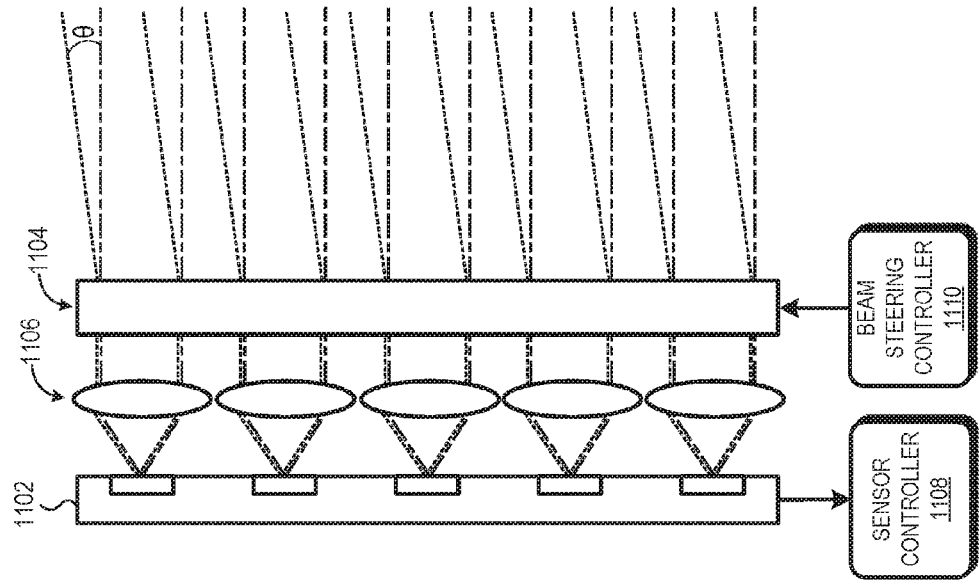
FIG. 11 is a cross-section view of a lightfield implementation of an image capture system using an electro-optical beam steering assembly in accordance with at least one embodiment of the present disclosure.

FIG. 11 illustrates an implementation of an image capture system 1100 for capturing a lightfield in accordance with at least one embodiment. In the depicted example, the image capture system 1100 includes an image sensor 1102, a beam steering assembly 1104, and a microlens array 1106 disposed between the beam steering assembly 1104 and the image sensor 1002. As with the beam steering assembly 104 of FIG. 1, the beam steering assembly 1004 may include a stack of one or more LCPG-based beam steering devices or other electro-optical beam steering devices, although FIG. 11 depicts only a single beam steering stage for ease of illustration. The image capture system 1100 further includes a sensor controller 1108 and a beam steering controller 1010. As a general operational overview, the image capture system 1100 time-multiplexes the capture of shifted images via beam steering provided by the beam steering assembly 1004 so as to capture a sequence of images which then may be implemented as a lightfield, with the angular information encoded by virtue of the net deflection angle(s) provided by the beam steering assembly 1104, rather than being encoded in the pixel information itself. As a result, a higher resolution lightfield may be captured compared to the conventional non-time-multiplexed approach having an image sensor of the same resolution as the image sensor 1102.

Figure 12:
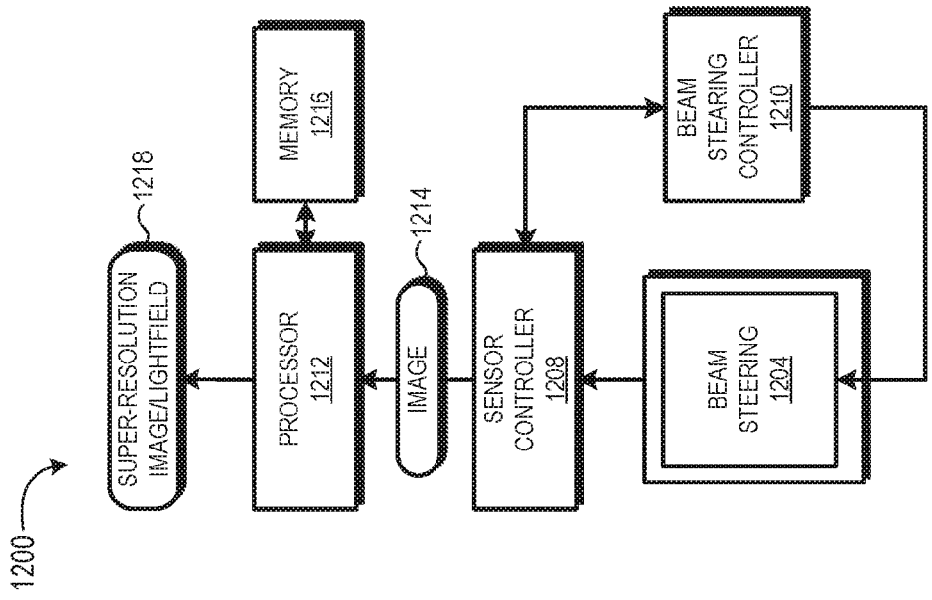
FIG. 12 is a diagram illustrating a processing system implemented in the image capture systems of FIGS. 10 and 11 in accordance with at least one embodiment of the present disclosure.

FIG. 12 illustrates an example processing system 1200 for implementing either of the imaging capture systems 1000 or 1100 in accordance with at least one embodiment. The processing system 1200 includes an image sensor 1202 (corresponding to the image sensor 1002/1102), a beam steering assembly 1204 (corresponding to the beam steering assembly 1004/1104), a sensor controller 1208 (corresponding to the sensor controller 1008/1108), a beam steering controller 1210 (corresponding to the beam steering controller 1010/1110), and a processor 1212. In operation, for each image capture iteration the beam steering controller 1210 configures the beam steering assembly 1204 to implement a corresponding net deflection angle for the current iteration, and then the sensor controller 1208 controls the image sensor 1202 to capture an image 1214 based on the light that passed through the beam steering assembly 1204. The sensor controller 1204 passes the captured image to the processor 1212, whereupon it may be temporarily buffered in a memory 1216. After a certain number of iterations, the processor 1212 then may combine the images 1214 generated from these iterations into a single super-resolution image or a lightfield (either of which is represented in FIG. 12 as image 1218). Alternatively, the images 1214 may be separately stored for later display using the time-multiplexed/beam-steered approach of the near-eye display system 100 described above.

Much of the inventive functionality and many of the inventive principles described above are well suited for implementation with or in integrated circuits (ICs) such as application specific ICs (ASICs). It is expected that one of ordinary skill, notwithstanding possibly significant effort and many design choices motivated by, for example, available time, current technology, and economic considerations, when guided by the concepts and principles disclosed herein will be readily capable of generating such ICs with minimal experimentation. Therefore, in the interest of brevity and minimization of any risk of obscuring the principles and concepts according to the present disclosure, further discussion of such software and ICs, if any, will be limited to the essentials with respect to the principles and concepts within the preferred embodiments.

In some embodiments, certain aspects of the techniques described above may implemented by one or more processors of a processing system executing software. The software comprises one or more sets of executable instructions stored or otherwise tangibly embodied on a non-transitory computer readable storage medium. The software can include the instructions and certain data that, when executed by the one or more processors, manipulate the one or more processors to perform one or more aspects of the techniques described above. The non-transitory computer readable storage medium can include, for example, a magnetic or optical disk storage device, solid state storage devices such as Flash memory, a cache, random access memory (RAM) or other non-volatile memory device or devices, and the like. The executable instructions stored on the non-transitory computer readable storage medium may be in source code, assembly language code, object code, or other instruction format that is interpreted or otherwise executable by one or more processors.

In this document, relational terms such as first and second, and the like, may be used solely to distinguish one entity or action from another entity or action without necessarily requiring or implying any actual such relationship or order between such entities or actions. The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element preceded by "comprises . . . a" does not, without more constraints, preclude the existence of additional identical elements in the process, method, article, or apparatus that comprises the element. The term "another", as used herein, is defined as at least a second or more. The terms "including" and/or "having", as used herein, are defined as comprising. The term "coupled", as used herein with reference to electro-optical technology, is defined as connected, although not necessarily directly, and not necessarily mechanically. The term "program", as used herein, is defined as a sequence of instructions designed for execution on a computer system. An "application", or "software" may include a subroutine, a function, a procedure, an object method, an object implementation, an executable application, an applet, a servlet, a source code, an object code, a shared library/dynamic load library and/or other sequence of instructions designed for execution on a computer system.

The specification and drawings should be considered as examples only, and the scope of the disclosure is accordingly intended to be limited only by the following claims and equivalents thereof. Note that not all of the activities or elements described above in the general description are required, that a portion of a specific activity or device may not be required, and that one or more further activities may be performed, or elements included, in addition to those described. Still further, the order in which activities are listed are not necessarily the order in which they are performed. The steps of the flowcharts depicted above can be in any order unless specified otherwise, and steps may be eliminated, repeated, and/or added, depending on the implementation. Also, the concepts have been described with reference to specific embodiments. However, one of ordinary skill in the art appreciates that various modifications and changes can be made without departing from the scope of the present disclosure as set forth in the claims below. Accordingly, the specification and figures are to be regarded in an illustrative rather than a restrictive sense, and all such modifications are intended to be included within the scope of the present disclosure.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

What is claimed is:

1. A near-eye display system comprising:
a display panel;
a beam steering assembly configured to be disposed between the display panel and an eye of a user, the beam steering assembly configurable to impart any of a plurality of net deflection angles to light incident on the beam steering assembly;
a display controller coupled to the display panel, the display controller to drive the display panel to display a sequence of at least two images; and
a beam steering controller coupled to the beam steering assembly, the beam steering controller to control the beam steering assembly to impart a different net deflection angle for each displayed image of the sequence.

2. The near-eye display system of claim 1, wherein:
the beam steering assembly comprises a stack of beam steering devices, each beam steering device having a different orientation relative to the other beam steering devices and configurable to impart a corresponding deflection angle to light incident on the beam steering device when the beam steering device is activated; and
wherein the net deflection angle imparted by the beam steering assembly is additive of the deflection angles of the activated beam steering devices of the stack.

3. The near-eye display system of claim 2, wherein:
the beam steering devices comprise liquid-crystal polarizing-grating devices.

4. The near-eye display system of claim 3, further comprising:
a collimating lens assembly disposed between the beam steering assembly and the display panel.

5. The near-eye display system of claim 1, wherein:
the sequence of images is displayed in a period of time less than a visual persistence interval so that the sequence of images is perceived by a user as a single image having an effective resolution higher than a resolution of the display panel.

6. The near-eye display system of claim 1, wherein:
the sequence of images is generated from a lightfield and wherein angular information of the lightfield is represented in the net deflection angle for each image of the sequence.

7. The near-eye display system of claim 6, further comprising:
an array of microlenses disposed between the beam steering assembly and the display panel.

8. The near-eye display system of claim 7, wherein:
wherein an offset between an optical axis of each microlens and a corresponding pixel of the display panel is based on a distance of the microlens from a center of the display panel.

9. The near-eye display system of claim 6, further comprising:
a refractive structure disposed at a user-facing surface of the beam steering assembly, the refractive structure comprising at least one of a microprism array and a Fresnel lens.

10. The near-eye display system of claim 1, wherein:
the sequence of images includes two or more images having the same visual content and which are displayed in a period of time less than a visual persistence interval so that the sequence of images is perceived by a user as a single image having a resolution of the display panel and having pixels with an apparent size that is larger than a size of the pixels of the display panel.

11. In a near-eye display system, a method comprising:
configuring a beam steering assembly in a first configuration so that the beam steering assembly imparts a first net deflection angle for incident light passing through the beam steering assembly;
controlling a display panel facing the beam steering assembly to display a first image while the beam steering assembly is in the first configuration;
configuring the beam steering assembly in a second configuration so that the beam steering assembly imparts a second net deflection angle for incident light passing through the beam steering assembly, the second net deflection angle different than the first net deflection angle; and
controlling the display panel to display a second image while the beam steering assembly is in the second configuration.

12. The method of claim 11, wherein:
the first net deflection angle is substantially equal to zero.

13. The method of claim 11, wherein:
the first and second images are displayed within a visual perception interval so that the first and second images are perceived by a user to be a single image with an effective resolution that is higher than a resolution of the display panel.

14. The method of claim 11, wherein:
the first and second images are generated from a lightfield and wherein angular information of the lightfield is represented in the net deflection angles implemented for display of the first and second images.

15. The method of claim 11, further comprising:
configuring the beam steering assembly in a third configuration so that the beam steering assembly imparts a third net deflection angle for incident light passing through the beam steering assembly; and
controlling the display panel to display a third image while the beam steering assembly is in the third configuration.

16. The method of claim 11, wherein:
the beam steering assembly comprises a stack of liquid-crystal polarizing-grating devices.

17. An image capture system comprising:
an image sensor;
a beam steering assembly facing the image sensor, the beam steering assembly configurable to impart one of a plurality of net deflection angles to light incident on the beam steering assembly;
a sensor controller coupled to the image sensor, the sensor controller to control the image sensor to capture a sequence of at least two images; and
a beam steering controller coupled to the beam steering assembly, the beam steering controller to control the beam steering assembly to impart a different net deflection angle for each image capture of the sequence.

18. The image capture system of claim 17, wherein:
the beam steering assembly comprises a stack of beam steering devices, each beam steering device having a different orientation relative to the other beam steering devices and configurable to impart a corresponding deflection angle to light incident on the beam steering device when activated; and
wherein the net deflection angle imparted by the beam steering assembly is additive of the deflection angles of the activated beam steering devices of the stack.

19. The image capture system of claim 18, wherein:
the beam steering devices comprise liquid-crystal polarizing-grating devices.

20. The image capture system of claim 17, further comprising:
a processor to combine the sequence of at least two images into a single image having an effective resolution greater than a resolution of the image sensor.

21. The image capture system of claim 17, further comprising:
a processor to combine the sequence of images into a lightfield, wherein angular information of the lightfield is represented in the net deflection angle for each image of the sequence.

22. In an image capture system, a method comprising:
configuring a beam steering assembly in a first configuration so that the beam steering assembly imparts a first net deflection angle for incident light passing through the beam steering assembly;
controlling an image sensor facing the beam steering assembly to capture a first image while the beam steering assembly is in the first configuration;
configuring the beam steering assembly in a second configuration so that the beam steering assembly imparts a second net deflection angle for incident light passing through the beam steering assembly, the second net deflection angle different than the first net deflection angle; and
controlling the image sensor to capture a second image while the beam steering assembly is in the second configuration.

23. The method of claim 22, further comprising:
configuring the beam steering assembly in a third configuration so that the beam steering assembly imparts a third net deflection angle for incident light passing through the beam steering assembly; and
controlling the image sensor to capture a third image while the beam steering assembly is in the third configuration.

24. The method of claim 22, further comprising:
combining the first and second images into a single image having an effective resolution higher than a resolution of the image sensor.

25. The method of claim 22, further comprising:
generating a lightfield based on the first and second images, wherein angular information of the lightfield is represented in the first and second net deflection angles implemented for capture of the first and second images.

* * * * *